(12) United States Patent
Kim

(10) Patent No.: US 8,931,911 B2
(45) Date of Patent: Jan. 13, 2015

(54) LIGHTING SYSTEM AND DISPLAY APPARATUS USING THE SAME

(75) Inventor: Sung Ho Kim, Seoul (KR)

(73) Assignee: LG Innotek Co., Ltd, Seoul (KR)

( * ) Notice: Subject to any disclaimer, the term of this patent is extended or adjusted under 35 U.S.C. 154(b) by 249 days.

(21) Appl. No.: 13/370,580

(22) Filed: Feb. 10, 2012

(65) Prior Publication Data
US 2013/0021779 A1    Jan. 24, 2013

(30) Foreign Application Priority Data

Jul. 19, 2011    (KR) .................. 10-2011-0071283

(51) Int. Cl.
*F21V 7/04* (2006.01)
*G02F 1/1335* (2006.01)

(52) U.S. Cl.
CPC .... *G02F 1/133615* (2013.01); *G02F 1/133605* (2013.01)
USPC ........... 362/97.1; 362/608; 362/609; 362/611

(58) Field of Classification Search
CPC .. G02B 6/0031; G02B 6/0055; G02B 6/0073; G02B 6/0036; G02B 6/0061; G02B 6/0016; G02B 6/0023; G02B 6/0096; G02F 1/133615
USPC ................. 362/97.1–97.4, 608–614
See application file for complete search history.

(56) References Cited

U.S. PATENT DOCUMENTS

| 7,284,893 | B2* | 10/2007 | Tseng | 362/625 |
| 8,197,105 | B2* | 6/2012 | Yang | 362/346 |
| 2006/0181901 | A1* | 8/2006 | Sakai et al. | 362/613 |
| 2006/0203467 | A1 | 9/2006 | Tseng | 362/30 |
| 2011/0267839 | A1* | 11/2011 | Kang et al. | 362/609 |
| 2011/0292679 | A1* | 12/2011 | Kim | 362/607 |

FOREIGN PATENT DOCUMENTS

| EP | 1 653 149 A1 | 5/2006 |
| JP | 2005-129409 A | 5/2005 |
| WO | WO 2011/050254 A1 | 4/2011 |

OTHER PUBLICATIONS

European Search Report dated Mar. 15, 2013 issued in Application No. 12 15 6819.

\* cited by examiner

*Primary Examiner* — Karabi Guharay
*Assistant Examiner* — Nathaniel Lee
(74) *Attorney, Agent, or Firm* — Ked & Associates, LLP

(57) ABSTRACT

Disclosed herein are a backlight unit and a display apparatus using the same. The backlight unit includes a first reflector, a second reflector partially having an inclined surface, at least one light source module disposed between the first and second reflectors, and at least one reflective structure disposed on the second reflector.

20 Claims, 22 Drawing Sheets

LIGHTING SYSTEM AND DISPLAY APPARATUS USING THE SAME

CROSS REFERENCE TO RELATED APPLICATION

This application claims priority under 35 U.S.C. §119 to Korean Patent Application No. 10-2011-0071283, filed in Korea on Jul. 19, 2011, which is hereby incorporated in its entirety by reference as if fully set forth herein.

TECHNICAL FIELD

Embodiments relate to a backlight unit and a display apparatus using the same.

BACKGROUND

In general, examples of a typical large-scale display apparatus include a Liquid Crystal Display (LCD), a Plasma Display Panel (PDP), etc.

Unlike the self-emission type PDP, the LCD requires a separate backlight unit due to absence of a self light emitting element.

A backlight unit for use in the LCD is classified into an edge type backlight unit and a direct type backlight unit depending on a position of a light source. In the edge type backlight unit, light sources are arranged at left and right side faces or upper and lower side faces of an LCD panel and a light guide plate is provided to uniformly diffuse light throughout a surface of the LCD panel, thereby ensuring uniform luminance and enabling production of an extremely thin display panel.

The direct type backlight unit is generally applied to displays of 20 inches or more. The direct type backlight unit advantageously has greater lighting efficiency than the edge type backlight unit owing to a plurality of light sources being arranged under a panel, and thus is mainly used in large-scale displays requiring high luminance.

The conventional edge type or direct type backlight unit adopts a Cold Cathode Fluorescent Lamp (CCFL) as a light source.

The backlight unit using the CCFL, however, has several disadvantages, such as consumption of a great quantity of power because power should always be applied to the CCFL, low color reproduction efficiency of about 70% that of a Cathode Ray Tube (CRT), and environmental pollution due to use of mercury.

Currently, a backlight unit using a Light Emitting Diode (LED) is being studied as a solution to the above-mentioned problems.

In the case of the backlight unit using the LED, turning on or off a part of an LED array is possible, which may achieve remarkable reduction in power consumption. In particular, an RGB LED exhibits color reproduction beyond 100% of a color reproduction range proposed by the National Television System Committee (NTSC) and may provide more vivid images to consumers.

SUMMARY

Embodiments provide a backlight unit capable of having an air guide using a reflective structure without a light guide plate and a display apparatus using the same.

In one embodiment, a backlight unit includes a first reflector, a second reflector partially having an inclined surface, at least one light source module disposed between the first and second reflectors, and at least one reflective structure disposed on the second reflector.

The inclined surface of the second reflector may be a surface inclined at a predetermined angle with respect to a surface of the first reflector, and the inclined surface may be at least any one of a concave surface, convex surface, and flat surface.

The inclined surface of the second reflector may overlap with the first reflector.

The second reflector may include at least one inclined surface and at least one flat surface, the flat surface of the second reflector may be a surface parallel to the first reflector, and the reflective structure may be disposed on at least any one of the inclined and flat surfaces of the second reflector.

The backlight unit may further include an optical member disposed to be spaced apart from the second reflector by a predetermined clearance so as to form a space therebetween, and an air guide may be defined in the space between the second reflector and the optical member.

The reflective structure may be disposed to be spaced apart from the optical member by a first distance, and the first distance may be greater than a thickness of the first reflector.

The reflective structure may be placed between a horizontal extension line which horizontally extends from the first reflector and the second reflector.

The reflective structure may include a reflective part to reflect light and a support part to support the reflective part, and the reflective part may be placed on the same line as the light source module.

The reflective part may have a stripe shape or a dot shape, which is arranged in the same direction as the light source module, and the reflective part may have a plurality of protrusions or grooves.

The plural protrusions or grooves adjacent to one another may be arranged side by side or alternately.

The reflective part may include a core and a reflective layer surrounding a whole or a portion of the core.

The reflective layer may be made of one reflective material having identical reflectivity or a plurality of reflective materials having different reflectivities, and the reflective layer may protrude from or be inserted into a surface of the core.

The support part may have a lower portion thicker than an upper portion thereof, and the support part may have a maximum width equal to or greater than a maximum width of the reflective part.

The support part may have a maximum height equal to or greater than a maximum height of the reflective part.

The reflective part may be coupled with the support part by a coupling member, and the coupling member may be any one of a plate shape, which is attached to an upper surface of the support part and supports a lower surface of the reflective part, a ring shape, which is attached to the upper surface of the support part and surrounds a circumference of the reflective part, and a projection shape, which is attached to the upper surface of the support part and is inserted into a groove of the reflective part.

The reflective part and the support part may also be attached by an adhesive.

The reflective part and the support part may be disposed in one-to-one correspondence proportion or in a one-to-many correspondence proportion.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or "under" another element, it can be directly on/under the element, and one or more intervening elements may also be present.

When an element is referred to as being 'on' or 'under', 'under the element' as well as 'on the element' can be included based on the element.

Figure 1A:
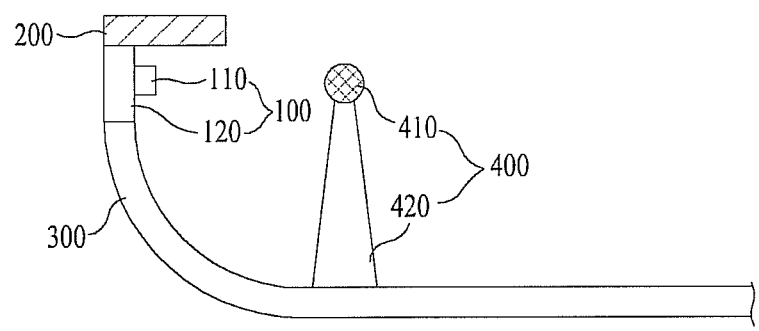
FIGS. 1A to 1C are views explaining a backlight unit according to an embodiment.
Figure 1B:
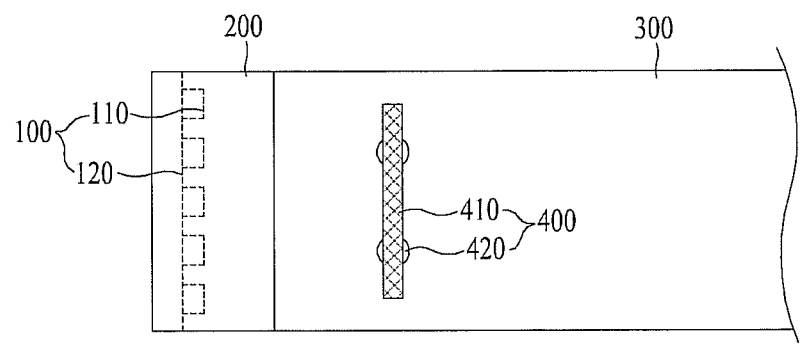
Figure 1C:
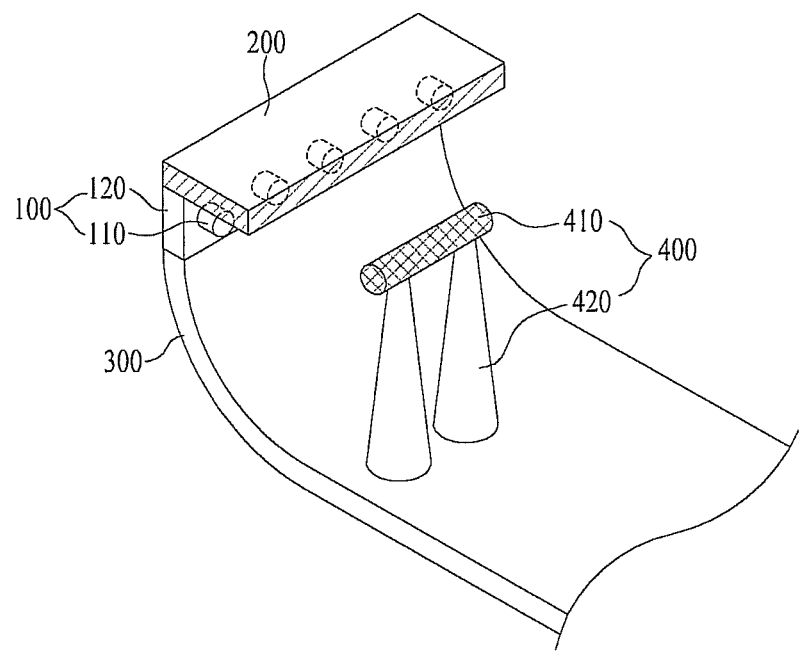

FIGS. 1A to 1C are views explaining a backlight unit according to an embodiment, wherein FIG. 1A is a sectional view, FIG. 1B is a top view, and FIG. 1C is a top perspective view.

As shown in FIGS. 1A to 1C, the backlight unit may include a light source module 100 including at least one light source 110 and a board 120, a first reflector 200, a second reflector 300, and a reflective structure 400 including reflective part 410 and support parts 420.

Here, the light source module 100 may be located between the first reflector 200 and the second reflector 300, and be disposed close to the first reflector 200 or the second reflector 300.

In some cases, the light source module 100 may come into contact with the first reflector 200 while being disposed to be spaced apart from the second reflector 300 by a predetermined clearance, or come into contact with the second reflector 300 while being disposed to be spaced apart from the first reflector 200 by a predetermined clearance.

Alternatively, the light source module 100 may be disposed to be spaced apart from both the first reflector 200 and the second reflector 300 by a predetermined clearance, or come into contact with both the first reflector 200 and the second reflector 300.

The light source module 100 may include a board 120 having an electrode pattern and the light source 110 to generate light.

In this case, the at least one light source 110 may be mounted on the board 120, and an adaptor for supply of power and the electrode pattern for connection of the light source 110 may be formed on the board 120.

The board 120 may be a Printed Circuit Board (PCB) made of polyethylene terephthalate (PET), glass, polycarbonate (PC), silicon (Si), or the like, on which a plurality of light sources is mounted, or may take the form of a film.

In addition, the board 120 may be selected from a group comprised of a single-layer PCB, a multi-layer PCB, a ceramic board, a metal core PCB, and the like.

Meanwhile, the light source 110 may be a Light Emitting Diode (LED) chip. The LED chip may be a blue LED chip or ultraviolet LED chip, or may be a package combining at least one or more selected from a group comprised of a red LED chip, green LED chip, blue LED chip, yellow green LED chip, and white LED chip.

A white LED may be embodied by coupling a yellow phosphor to a blue LED, coupling both red and green phosphors to the blue LED, or coupling yellow, red and green phosphors to the blue LED at the same time.

Furthermore, the light source 110 may be a top view type light emitting diode or a side view type light emitting diode, as occasion demands.

Next, first reflector 200 and the second reflector 300 may be spaced apart from each other by a predetermined distance so as to face each other such that an air guide is defined in an empty space between the first reflector 200 and the second reflector 300.

The first reflector 200 may be made of any one of a reflective coating film and a reflective coating material layer, and may serve to reflect light emitted from the light source module 100 toward the second reflector 300.

Furthermore, a saw-toothed reflective pattern may be formed on a surface of the first reflector 200 facing the light source module 100. The reflective pattern may have a flat surface or a curved surface.

The surface of the first reflector 200 is formed with the reflective pattern so as to reflect light emitted from the light source module 100 toward a central region of the second reflector 300, thereby enhancing luminance of a central region of the backlight unit.

The second reflector 300 may partially have an inclined surface, and contain a metal or a metal oxide having high reflectivity, such as Al, Ag, Au, $TiO_2$, or the like.

The inclined surface of the second reflector 300 may overlap with at least any one of the light source module 100 and the first reflector 200.

The inclined surface of the second reflector 300 may be a surface inclined at a predetermined angle with respect to the surface of the first reflector 200. The inclined surface may be at least any one of a concave surface, convex surface, and flat surface.

In some cases, the second reflector 300 may include at least one inclined surface and at least one flat surface. The flat surface of the second reflector 300 may be a surface parallel to the first reflector 200, and the reflective structure 400 may be disposed on at least any one of the inclined and flat surfaces of the second reflector 300.

Alternatively, the second reflector 300 may include at least two inclined surfaces, namely, first and second inclined surfaces having at least one inflection point. The first and second inclined surfaces adjacent to each other about the inflection point may have different curvatures from each other, and the reflective structure 400 may be disposed on at least any one of the first and second inclined surfaces of the second reflector 300.

Meanwhile, one or a plurality of reflective structures 400 may be disposed on the second reflector 300. One or a plurality of reflective structures 400 may be disposed on the inclined surface, the flat surface, or both the inclined and flat surfaces as occasion demands, among the whole surface of the second reflector 300.

The at least one reflective structure 400 may include the reflective part 410 and the support parts 420. The reflective part 410 may serve to reflect light, whereas the support parts 420 may serve to support the reflective part 410.

In this case, the reflective part 410 may be placed on the same line as the light source module 100.

The reflective part 410 may have a stripe shape or a dot shape, which is arranged in the same direction as the light source module 100.

In addition, the reflective part 410 may be a reflector coated with a reflective material, but the reflective part 410 may be an optical fiber, a Cold Cathode Fluorescent Lamp (CCFL), or the like.

Each of the support parts 420 may also be coated, on a surface thereof, with a reflective material.

As such, the reflective structure 400 may be disposed on a region having a relatively low luminance in the second reflector 300, thereby enabling compensation for low luminance by reflection of light.

Figure 2A:
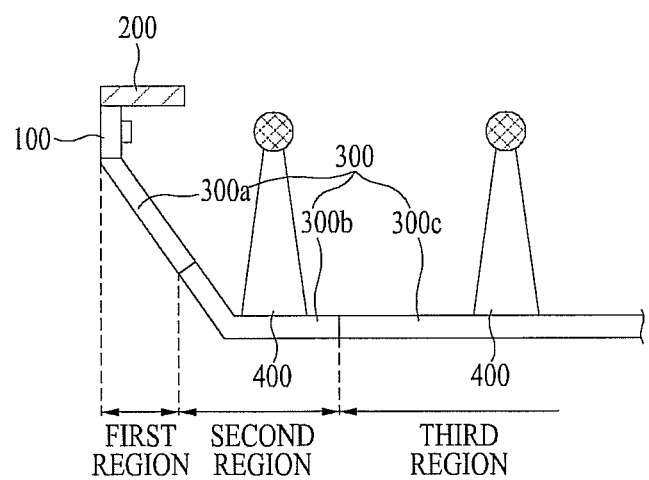
FIGS. 2A to 2C are views illustrating a reflective structure which is disposed on a second reflector having inclined and flat surfaces.
Figure 2B:
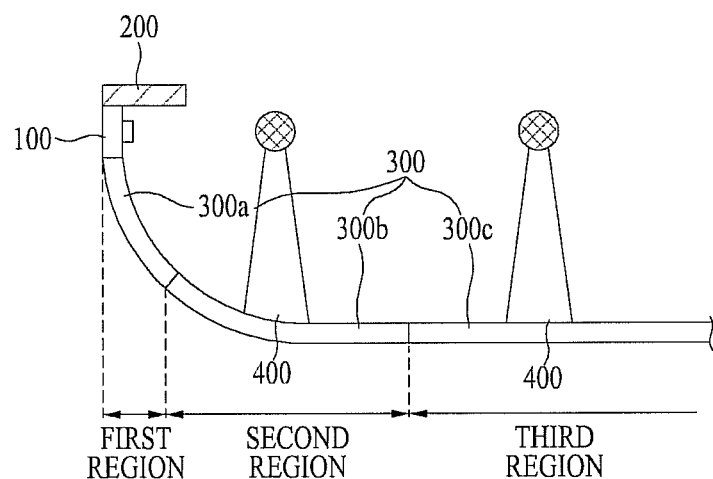
Figure 2C:
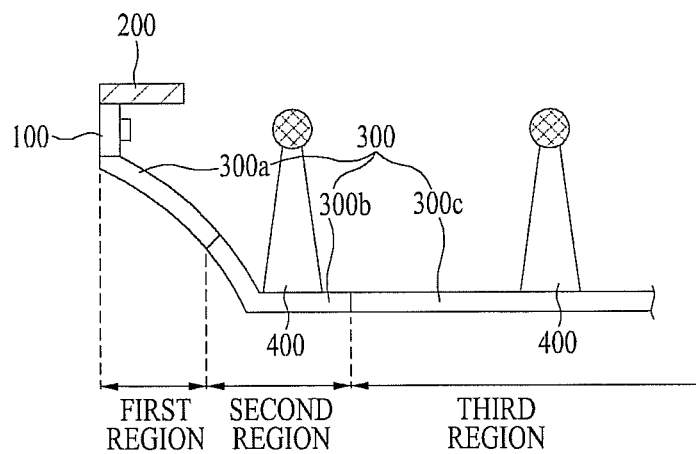

FIGS. 2A to 2C are views illustrating the reflective structure which is disposed on a second reflector having inclined and flat surfaces.

FIG. 2A illustrates that the inclined surface of the second reflector 300 is a flat surface, FIG. 2B illustrates that the inclined surface of the second reflector 300 is a concave curved surface, and FIG. 2C illustrates that the inclined surface of the second reflector 300 is a convex curved surface.

In the second reflector 300, a first region 300a may be the inclined surface, a second region 300b may have the inclined surface and the flat surface, and a third region 300c may be the flat surface.

The reflective structure 400 may be disposed on at least any one of the second and third regions 300b and 300c of the second reflector 300.

Figure 3A:
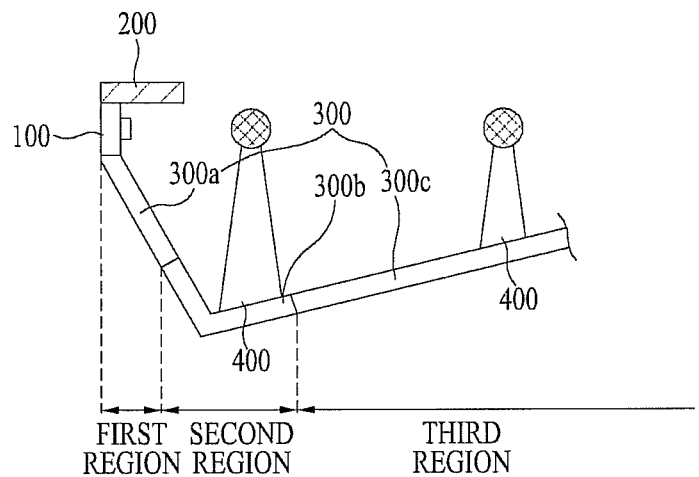
FIGS. 3A to 3C are views illustrating the reflective structure which is disposed on the second reflector having a plurality of inclined surfaces.
Figure 3B:
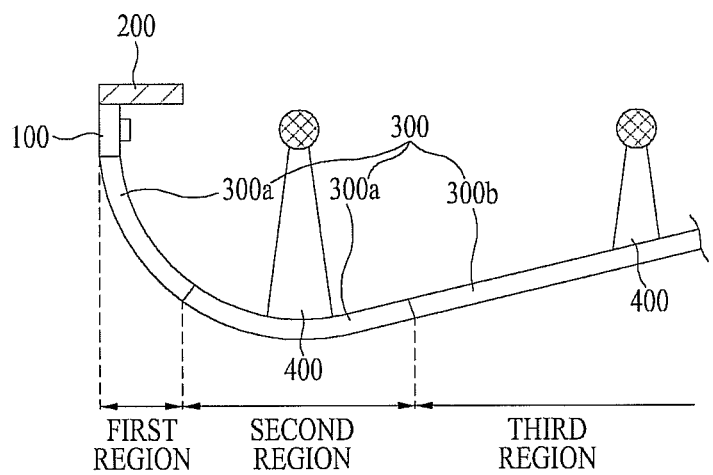
Figure 3C:
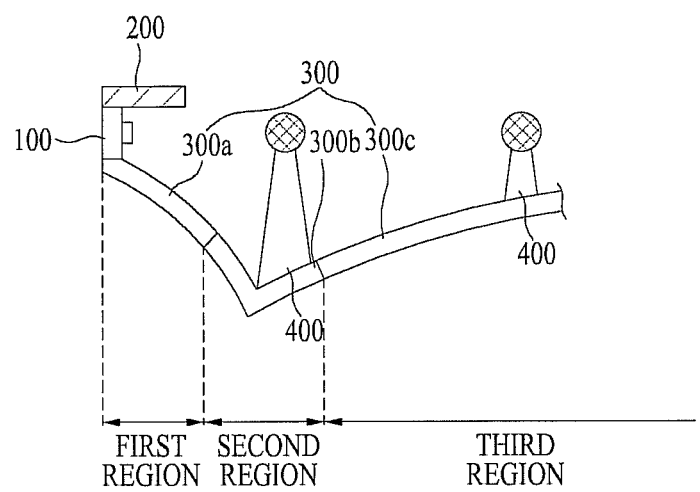

FIGS. 3A to 3C are views illustrating the reflective structure which is disposed on the second reflector having a plurality of inclined surfaces.

FIG. 3A illustrates that two inclined surface adjacent to each other are flat surfaces, FIG. 3B illustrates that two inclined surface adjacent to each other are concave curved surfaces and also have different curvatures from each other, and FIG. 3C illustrates that two inclined surface adjacent to each other are convex curved surfaces and also have different curvatures.

As shown in FIGS. 3A to 3C, the second reflector 300 may include a first region 300a adjacent to the light source module 100, a third region 300c spaced apart from the light source module 100, and a second region 300b located between the first region 300a and the third region 300c.

In the second reflector 300, the first region 300a may be the inclined surface, the second region 300b may have the inclined surface and the flat surface, and the third region 300c may be the flat surface.

The reflective structure 400 may be disposed on at least any one of the second and third regions 300b and 300c of the second reflector 300.

As such, the reflective structure 400 may be disposed on at least any one of the second and third regions 300b and 300c having a relatively low luminance in the second reflector 300, thereby enabling compensation for low luminance by reflection and diffusion of light.

Figure 4A:
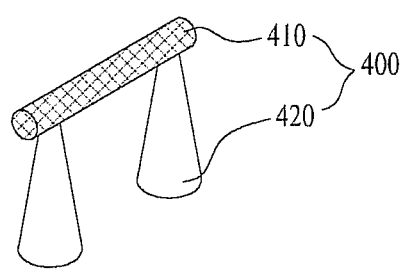
FIG. 4A is a perspective view illustrating the reflective structure having a stripe shape.
Figure 4B:
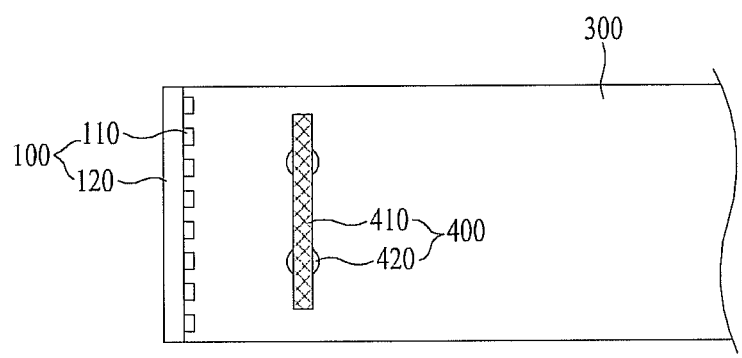
FIG. 4B is a top view illustrating the reflective structure disposed on the second reflector.

FIG. 4A is a perspective view illustrating the reflective structure having a stripe shape. FIG. 4B is a top view illustrating the reflective structure disposed on the second reflector.

As shown in FIGS. 4A and 4B, the reflective structure 400 having the stripe shape includes the reflective part 410 and the support parts 420. The reflective part 410 may be a reflector coated with a reflective material, an optical fiber, or a light source such as a Cold Cathode Fluorescent Lamp (CCFL) or the like.

Here, the reflective part 410 may be formed in the stripe shape, and one reflective part 410 may be arranged in parallel to and in the same direction as the light source module 100.

A plurality of support parts 420 may be disposed under the reflective part 410 so as to support the reflective part 410.

Each of the support parts 420 may also be coated, on the surface thereof, with a reflective material so as to reflect light.

Figure 5A:
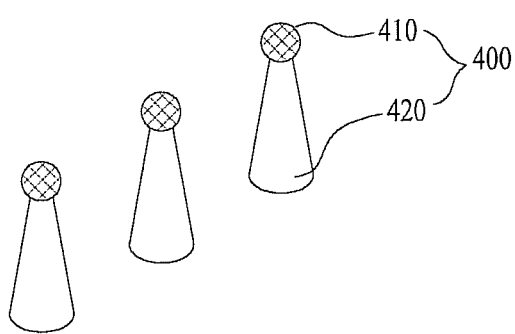
FIG. 5A is a perspective view illustrating reflective structures having a dot shape.
Figure 5B:
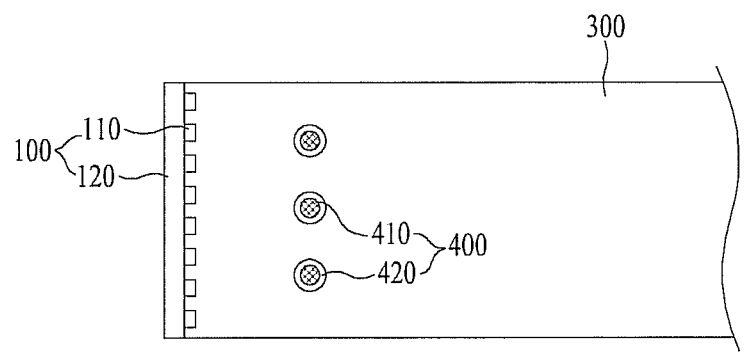
FIG. 5B is a top view illustrating the reflective structures disposed on the second reflector.

FIG. 5A is a perspective view illustrating reflective structures having a dot shape. FIG. 5B is a top view illustrating the reflective structures disposed on the second reflector.

As shown in FIGS. 5A and 5B, each of the reflective structures 400 having the dot shape includes a reflective part 410 and a support part 420. The reflective part 410 may be a reflector coated with a reflective material.

Here, the reflective part 410 may be formed in the dot shape, and a plurality of reflective parts 410 may be arranged side by side with and in the same direction as the light source module 100.

One support part 420 may be disposed under one reflective part 410 in one-to-one correspondence with the reflective part 410, and may support the reflective part 410.

The support part 420 may also be coated, on the surface thereof, with a reflective material so as to reflect light.

As such, the reflective part 410 and the support part 420 may be disposed in one-to-one correspondence proportion as shown in FIG. 5A, or may be disposed in a one-to-many correspondence proportion as shown in FIG. 4A.

FIGS. 6A to 6F are views illustrating a shape of the reflective part of the reflective structure.

Figure 6A:
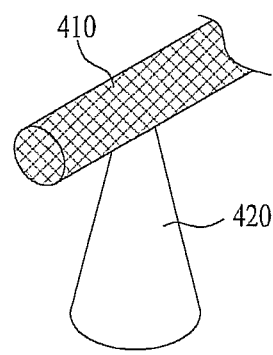
FIGS. 6A to 6F are views illustrating a shape of a reflective part of the reflective structure.

As shown in FIG. 6A, the reflective part 410 supported by the support part 420 may have a circular shape in section, or an oval shape in section as occasion demands.

Figure 6B:
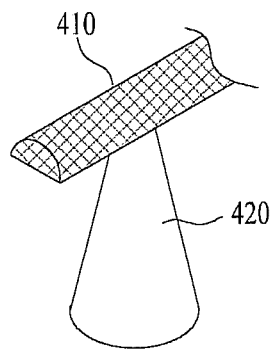

Also, as shown in FIG. 6B, the reflective part 410 may have a semicircular shape in section, which is flat at a lower surface thereof and is round at an upper surface thereof, in order to provide stability.

Figure 6C:
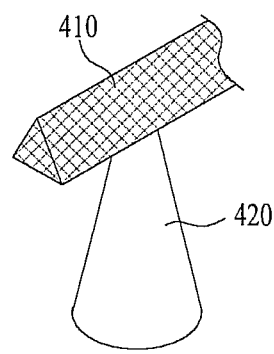

In addition, as shown in FIG. 6C, the reflective part 410 may have a triangular shape in section, or an inverted triangular shape in section as occasion demands.

Figure 6D:
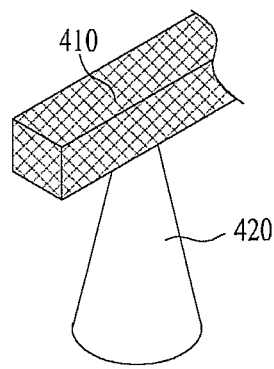
Figure 6E:
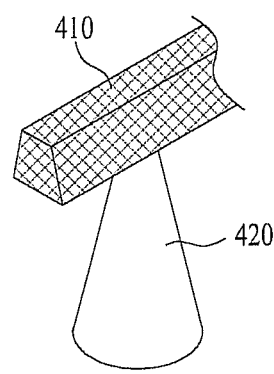
Figure 6F:
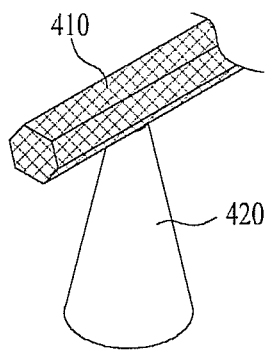

Furthermore, as shown in FIGS. 6D to 6F, the reflective part 410 may have a polygonal shape in section.

Here, the polygonal shape may be a square, rectangular, trapezoid, or diamond shape, or may also be a polygonal shape having four or more edges.

Figure 7A:
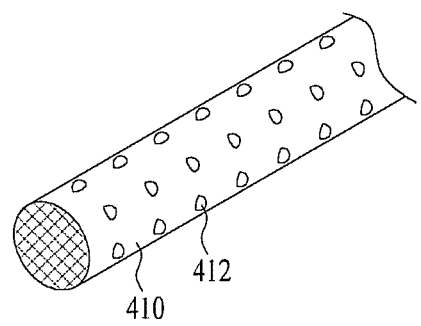
FIGS. 7A and 7B are views illustrating the reflective part having a plurality of fine protrusions.
Figure 7B:
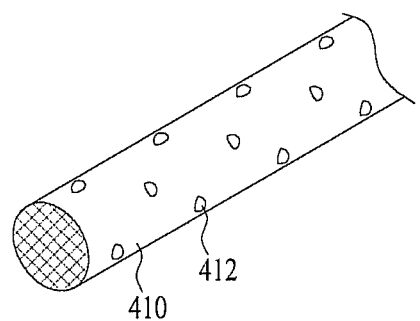

FIGS. 7A and 7B are views illustrating the reflective part having a plurality of fine protrusions.

As shown in FIG. 7A, the reflective part 410 of the reflective structure may be formed, on a surface thereof, with a plurality of fine protrusions 412.

Here, the plural fine protrusions 412 may be disposed throughout the surface of the reflective part 410, and the fine protrusions 412 adjacent to one another may be disposed to be spaced apart from one another by a predetermined clearance while being arranged side by side.

In some cases, the plural fine protrusions 412 may be disposed throughout the surface of the reflective part 410, and the fine protrusions 412 adjacent to one another may also be disposed to be spaced apart from one another by a predetermined clearance while being arranged alternately, as shown in FIG. 7B.

Here, each of the fine protrusions 412 may serve as a reflector coated with a reflective material and may reflect and diffuse light, thereby enabling provision of uniform luminance.

Figure 8A:
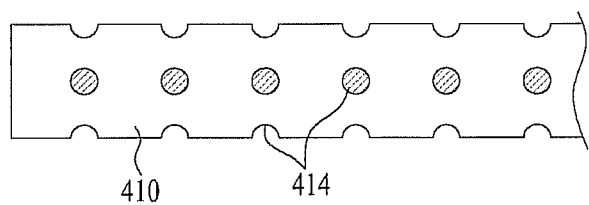
FIGS. 8A and 8B are views illustrating the reflective part having a plurality of fine grooves.
Figure 8B:
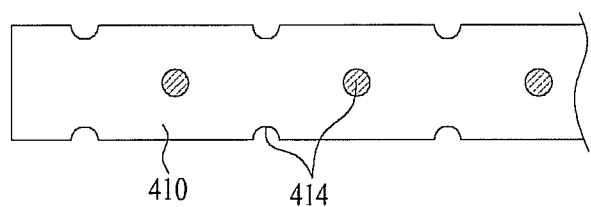

FIGS. 8A and 8B are views illustrating the reflective part having a plurality of fine grooves.

As shown in FIG. 8A, the reflective part 410 of the reflective structure may be formed, on the surface thereof, with a plurality of fine grooves 414.

Here, the plural fine grooves 414 may be disposed throughout the surface of the reflective part 410, and the fine grooves 414 adjacent to one another may be disposed to be spaced apart from one another by a predetermined clearance while being arranged side by side.

In some cases, the plural fine grooves 414 may be disposed throughout the surface of the reflective part 410, and the fine grooves 414 adjacent to one another may also be disposed to be spaced apart from one another by a predetermined clearance while being arranged alternately, as shown in FIG. 8B.

Here, each of the fine grooves 414 may serve as a reflector coated with a reflective material and may reflect and diffuse light, thereby enabling provision of uniform luminance.

Figure 9A:
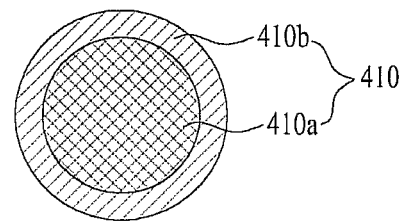
FIGS. 9A to 9D are sectional views illustrating the reflective part formed with a reflective layer.
Figure 9B:
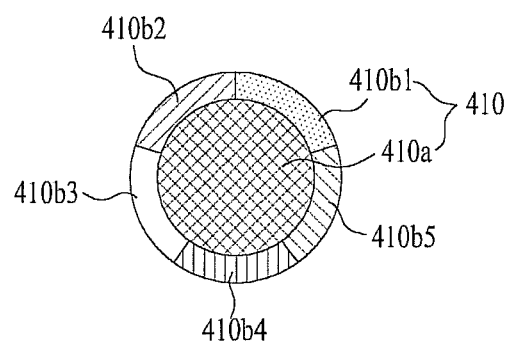
Figure 9C:
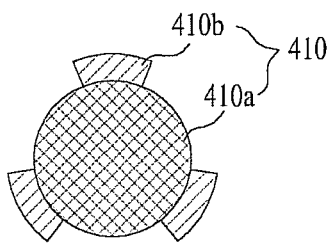
Figure 9D:
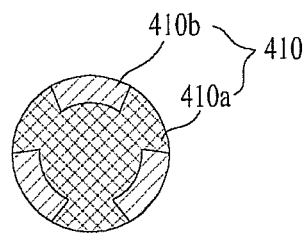

FIGS. 9A to 9D are sectional views illustrating the reflective part formed with a reflective layer, wherein FIGS. 9A and 9B are views illustrating the reflective layer coating a whole surface of the reflective part, and FIGS. 9C and 9D are views illustrating the reflective layer coating a partial surface of the reflective part.

As shown in FIGS. 9A to 9D, the reflective part 410 may include a core 410*a* and a reflective layer 410*b* surrounding a whole or partial surface of the core 410*a*.

Here, the core 410*a* may also be made of a polymer resin material such as plastic so as to be fabricated by injection molding.

The reflective layer 410*b* may be a reflective coating film fabricated in the form of a film, or a reflective coating material layer on which a reflective material is deposited.

In addition, the reflective layer 410*b* may contain at least one of a metal or a metal oxide. For example, the reflective layer 410*b* may contain the metal or metal oxide having high reflectivity, such as Al, Ag, Au, or $TiO_2$.

In this case, the reflective layer 410*b* may be formed by deposition or coating a metal or metal oxide on, or by printing a metal ink on the core 410*a* made of a polymer resin material.

Here, a vacuum deposition method, such as thermal deposition, evaporation, or sputtering, may be used as a deposition method, and a printing, a gravure coating, or a silk screening may be used as a coating or printing method.

Also, the reflective layer 410*b* may be fabricated in the form of a film or sheet so as to be adhered to the core 410*a* made of a polymer resin material with an adhesive.

As such, since the reflective part 410 may include the core 410*a* and a single reflective layer 410*b* surrounding the whole surface of the core 410*a*, as shown in FIG. 9A, the reflective part 410 may have identical reflectivity throughout the entirety thereof.

In addition, since the reflective part 410 may include the core 410*a* and a plurality of reflective layers 410*b*1, 410*b*2, 410*b*3, 410*b*4, and 410*b*5 surrounding the whole surface of the core 410*a*, as shown in FIG. 9B, the reflective part 410 may also have various kinds of reflectivity.

Furthermore, the reflective part 410 may include the core 410*a* and a reflective layer 410*b* formed only on the partial surface of the core 410*a*, as shown in FIG. 9C.

Here, the reflective layer 410*b* may be formed to protrude from the partial surface of the core 410*a* so as to partially expose the surface of the core 410*a*.

In some cases, the reflective part 410 may include a core 410*a* having a plurality of grooves and a reflective layer 410*b* formed in each groove of the core 410*a*, as shown in FIG. 9D.

Here, the reflective layer 410*b* may be formed to be inserted into the corresponding groove of the core 410*a* so as to partially expose the surface of the core 410*a*.

As such, the reflective layer 410*b* may be made of one reflective material having identical reflectivity or a plurality of reflective materials having different reflectivities.

The reflective layer 410*b* may protrude from or may be inserted into the surface of the core 410*a*.

FIGS. 10A to 10D are views illustrating a coupling member to couple the reflective part to the support part.

Figure 10A:
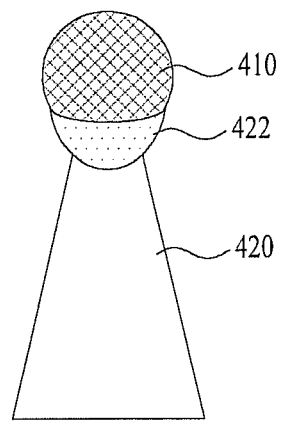
FIGS. 10A to 10D are views illustrating a coupling member to couple a reflective part to a support part.

As shown in FIG. 10A, the reflective structure 400 may include the reflective part 410 and the support part 420, and the reflective part 410 may be stably coupled to an upper surface of the support part 420 by the coupling member 422.

Here, the coupling member 422 may have a plate shape, which is attached to the upper surface of the support part 420 and supports a lower surface of the reflective part 410.

Figure 10B:
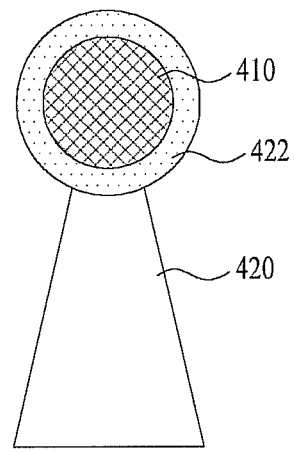

As shown in FIG. 10B, the coupling member 422 may also have a ring shape, which is attached to the upper surface of the support part 420 and surrounds a circumference of the reflective part 410.

Figure 10C:
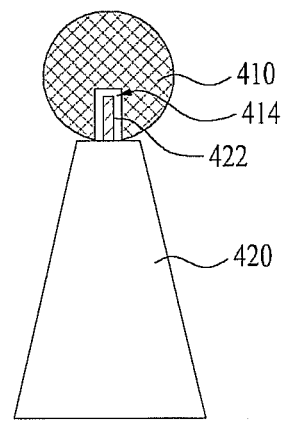

In addition, as shown in FIG. 10C, the coupling member 422 may also be a projection shape, which is attached to the upper surface of the support part 420 and is inserted into a groove 414 of the reflective part 410.

Figure 10D:
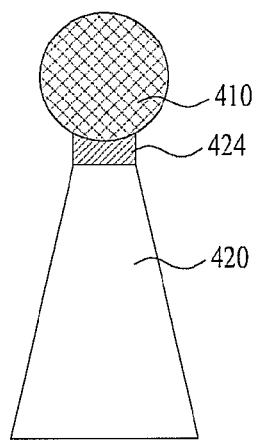

Furthermore, as shown in FIG. 10D, the reflective part and the support part 420 may also be attached by an adhesive 424 instead of the coupling member 422.

Figure 11:
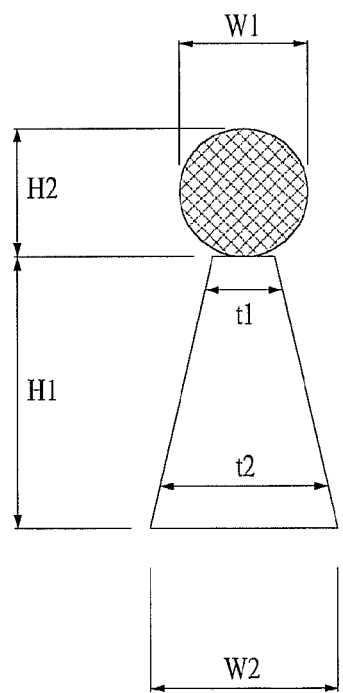
FIG. 11 is a view comparing a width and height of each of the reflective part and support part in the reflective structure.

FIG. 11 is a view comparing a width and height of each of the reflective part and support part in the reflective structure.

As shown in FIG. 11, the support part 420 may have a lower portion thicker than an upper portion thereof, in order to stably support the reflective part 410.

That is, the support part 420 may have a lower thickness t2 greater than an upper thickness t1 thereof.

In some cases, the lower thickness t2 of the support part 420 may also be equal to the upper thickness t1 thereof.

The support part 420 may have a lower surface width W2 greater than an upper surface width W1 of the reflective part 410.

In some cases, the lower surface width W2 of the support part 420 may also be equal to the upper surface width W1 of the reflective part 410.

In addition, the support part 420 may have a height H1 greater than a height H2 of the reflective part 410, and the height H1 of the support part 420 may also be equal to the height H2 of the reflective part 410 as occasion demands.

Here, the support part 420 may have a variable height so that the reflective part 410 is placed on the same line as the light source module 100.

Because the reflective part 410 is the closest to the light source module, effective reflection of light and maximum compensation for luminance may be ensured due to collinear placement of the reflective part 410 and the light source module.

Figure 12:
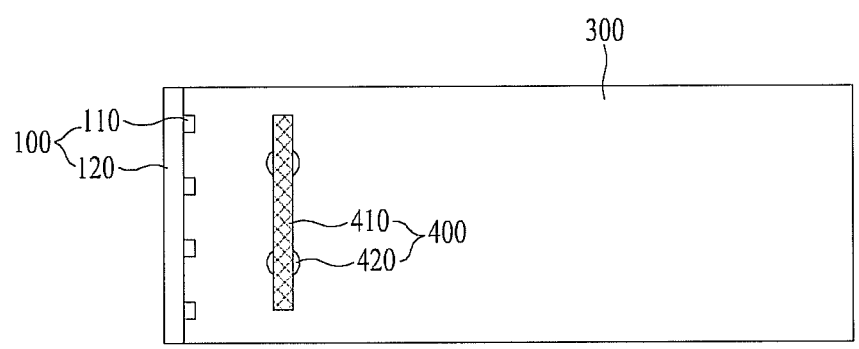
FIG. 12 is a view illustrating a reflective structure disposed on a one-edge type second reflector.
Figure 13:
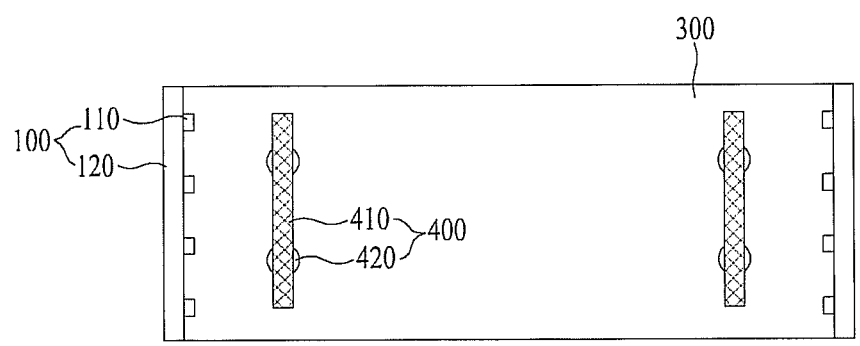
FIG. 13 is a view illustrating reflective structures disposed on a two-edge type second reflector.
Figure 14:
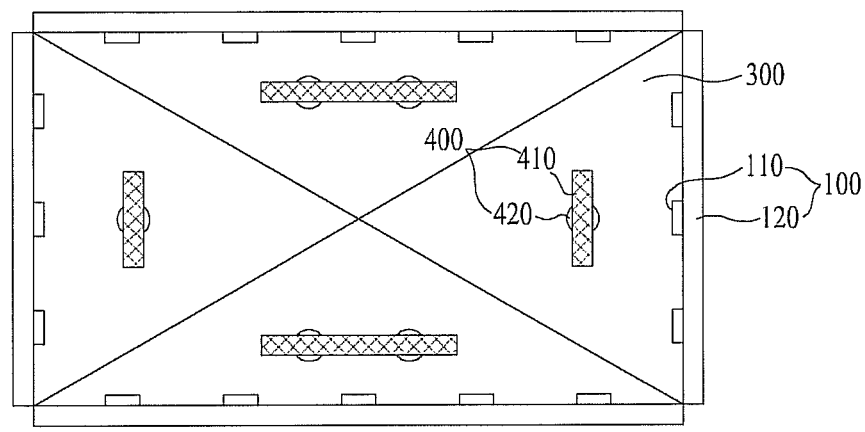
FIGS. 14 and 15 are views illustrating reflective structures disposed on a four-edge type second reflector.
Figure 15:
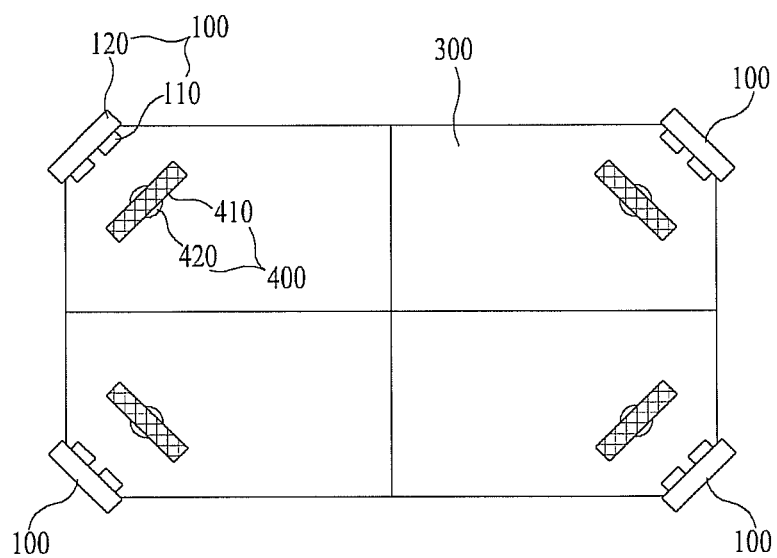

FIG. 12 is a view illustrating a reflective structure disposed on a one-edge type second reflector. FIG. 13 is a view illustrating reflective structures disposed on a two-edge type second reflector. FIGS. 14 and 15 are views illustrating reflective structures disposed on a four-edge type second reflector.

FIG. 12 is a top view illustrating the reflective structure disposed on the one-edge type second reflector. As shown in FIG. 12, the one-edge type second reflector 300 may be disposed, at one side thereof, with a light source module 100, and the reflective structure 400 may be disposed on a predetermined region of the second reflector 300.

Also, FIG. 13 is a top view illustrating the reflective structures disposed on the two-edge type second reflector. As shown in FIG. 13, the two-edge type second reflector 300 may be disposed, at opposite sides thereof, with light source modules 100 and be divided into first and second regions corresponding to the respective light source modules 100, and the reflective structures 400 may be disposed on the first and second regions of the second reflector 300, respectively.

In addition, FIG. 14 is a top view illustrating the reflective structures disposed on the four-edge type second reflector. As shown in FIG. 14, the four-edge type second reflector 300 may be disposed, at four sides thereof, with light source modules 100, respectively, and be divided into first, second, third, and fourth regions corresponding to the respective light source modules 100, and the reflective structures 400 may be disposed on the first, second, third, and fourth regions of the second reflector 300, respectively.

Furthermore, FIG. 15 is a top view illustrating the reflective structures disposed on the four-edge type second reflector. As shown in FIG. 15, the four-edge type second reflector 300 may be disposed, at four edge areas thereof, with light source modules 100, respectively, and be divided into first, second, third, and fourth regions corresponding to the respective light source modules 100, and the reflective structures 400 may be disposed on the first, second, third, and fourth regions of the second reflector 300, respectively.

Meanwhile, the backlight unit according to the illustrated embodiment may further include an optical member spaced apart from the second reflector by a predetermined clearance so as to form a space therebetween, and an air guide may be defined in the space between the second reflector and the optical member.

Figure 16:
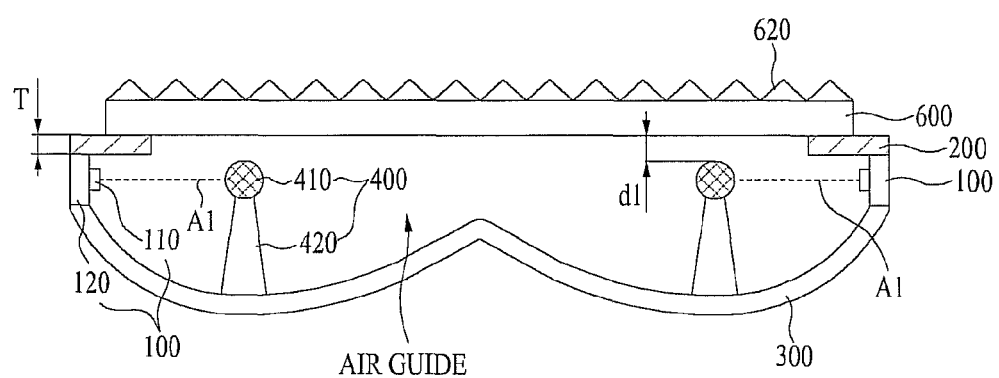
FIG. 16 is a view illustrating the backlight unit including an optical member.

FIG. 16 is a view illustrating the backlight unit including the optical member.

As shown in FIG. 16, the optical member 600 may be disposed at an open region of the first reflector 200 while being formed, on an upper surface thereof, with a roughened pattern 620.

Here, the optical member 600 may serve to diffuse light emitted through the open region of the first reflector 200. In order to enhance such diffusion of light, the upper surface of the optical member 600 may be formed with the roughened pattern 620.

That is, the optical member 600 may be formed in a plurality of layers, and the roughened pattern 620 may be formed on an uppermost layer or any one layer of the plural layers.

The roughened pattern 620 may have a stripe shape disposed along the light source module 100.

In this case, the roughened pattern 620 may have projections which protrude from the surface of the optical member 600, each of the projections may consist of first and second surfaces facing each other, and the first surface may make an obtuse angle or an acute angle with the second surface.

In some cases, the optical member 600 may include at least one sheet selected from a group comprised of a diffusion sheet, prism sheet, luminance enhancement sheet, and the like.

The diffusion sheet serves to diffuse light emitted from the light source, the prism sheet serves to guide the diffused light to a light emitting region, and the luminance enhancement sheet serves to enhance luminance.

Meanwhile, each reflective structure 400 including the reflective part 410 and the support part(s) 420 may be disposed to be spaced apart from the optical member 600 by a first distance d1.

The first distance d1 may be greater than a thickness T of the first reflector 200.

The reflective structure 400 is disposed to be spaced apart from the optical member 600 by the first distance d1, in order to prevent deterioration of luminance due to generation of shadow such as a black line when the reflective structure 400 is disposed close to the optical member 600.

Accordingly, the reflective structure 400 may be placed between a horizontal extension line which horizontally extends from the first reflector 200 and the second reflector 300.

The reflective part 410 of the reflective structure 400 may be placed on the same line A1 as the light source 110 of the light source module 100.

This is because the reflective part 410 may ensure effective reflection of light and maximum compensation for luminance owing to the reflective part 410 being the closest to the light source 110 of the light source module 100.

As such, the backlight unit is additionally disposed with the reflective structure on the second reflector, thereby enabling enhancement of luminance and provision of uniform luminance.

Figure 17:
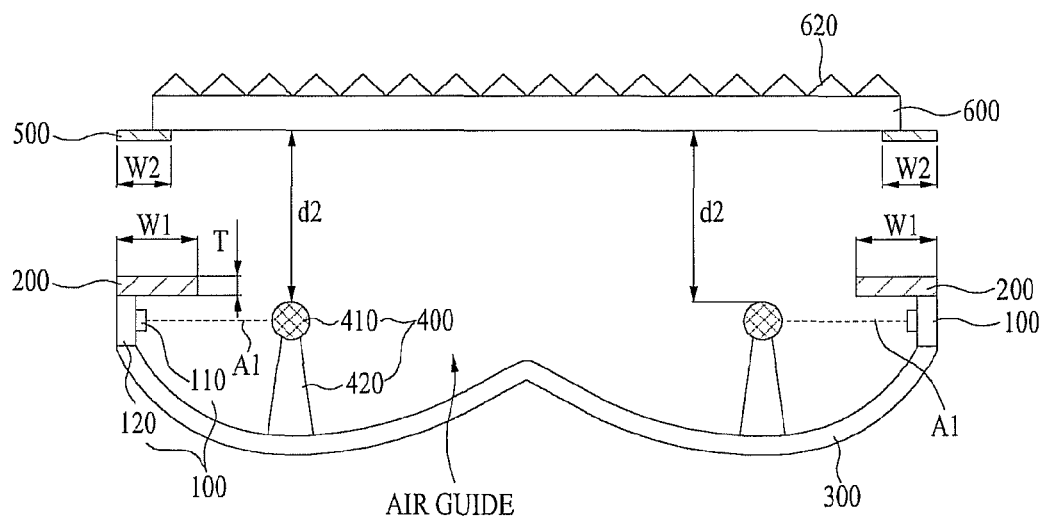
FIG. 17 is a view illustrating the optical member supported by support frames.

FIG. 17 is a view illustrating the optical member supported by support frames.

As shown in FIG. 17, the first reflector 200 may be further formed, at opposite sides of an upper portion thereof, with support frames 500 to support the optical member 600.

The optical member 600 is supported by the support frames 500, thereby enabling formation of an additional empty space between the second reflector 300 and the optical member 600.

As such, when the empty space between the second reflector 300 and the optical member 600 is additionally secured by the support frames 500, uniform luminance may be obtained through the air guide which is the empty space for diffusion of light.

Here, each of the support frames 500 may have a width W2 less than or equal to a width W1 of the first reflector 200.

This may prevent reduction in a luminance region by the support frames 500.

Meanwhile, each reflective structure 400 including the reflective part 410 and the support part(s) 420 may be disposed to be spaced apart from the optical member 600 by a second distance d2.

The second distance d2 may be greater than the thickness T of the first reflector 200.

As such, since shadow such as a black line, when the distance between the reflective structure 400 and the optical member 600 is large, does not appear, uniform luminance may be provided.

The reflective part 410 of the reflective structure 400 may be placed on the same line A1 as the light source 110 of the light source module 100.

This is because the reflective part 410 may ensure effective reflection of light and maximum compensation for luminance owing to the reflective part 410 being the closest to the light source 110 of the light source module 100.

As such, the backlight unit is additionally disposed with the reflective structure on the second reflector, thereby enabling enhancement of luminance and provision of uniform luminance.

As described above, the embodiments provide the reflector for the air guide which is disposed with the reflective structure without using a light guide plate, thereby enabling provision of weight reduction, low cost, and uniform luminance.

Thus, the backlight unit can achieve improved economic efficiency and reliability.

Figure 18:
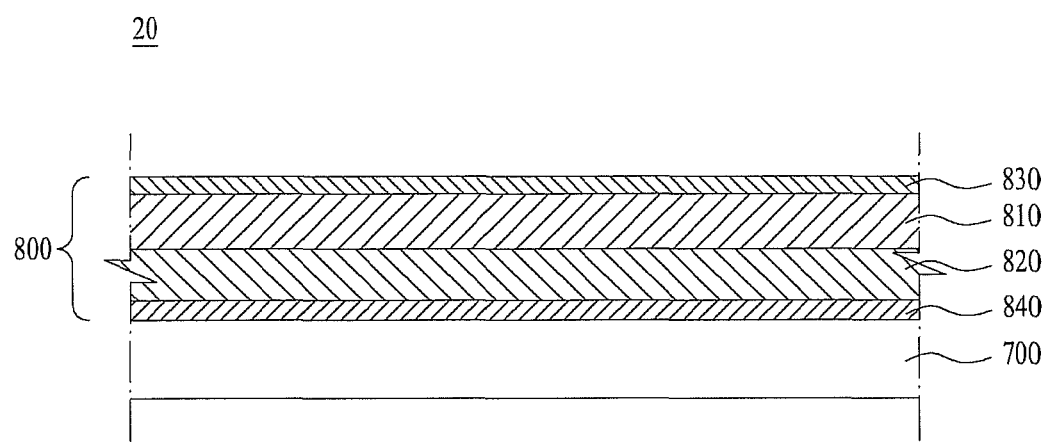
FIG. 18 is a view illustrating a display module having a backlight unit according to an embodiment.

FIG. 18 is a view illustrating a display module having a backlight unit according to an embodiment.

As shown in FIG. 18, the display module 20 may include a display panel 800 and a backlight unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

The display panel 800 may be disposed, at upper and lower sides thereof, with an upper polarizing plate 830 and a lower polarizing plate 840, respectively. More particularly, the upper polarizing plate 830 may be disposed at an upper surface of the color filter substrate 810 and the lower polarizing plate 840 may be disposed at a lower surface of the TFT substrate 820.

Although not shown, the display panel 800 may be provided, at a lateral surface thereof, with gate and data drivers for generation of drive signals required to drive the display panel 800.

Figure 19:
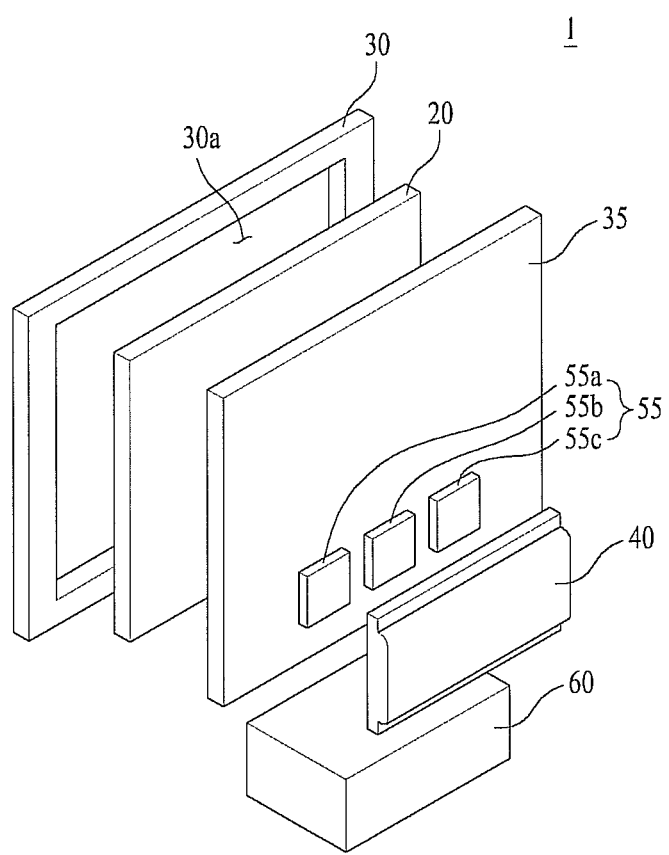
FIGS. 19 and 20 are views illustrating a display apparatus according to an embodiment.
Figure 20:
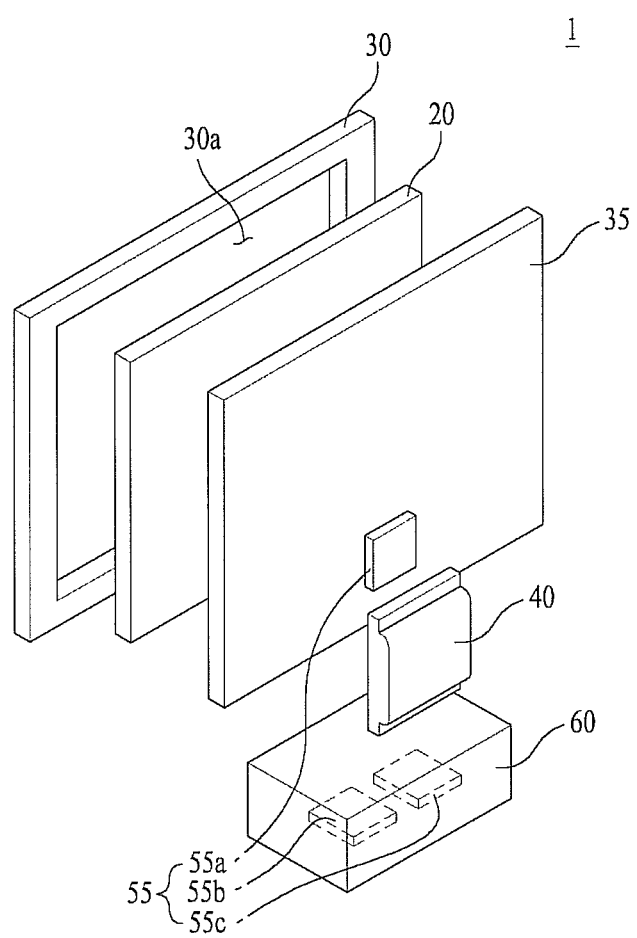

FIGS. 19 and 20 are views illustrating a display apparatus according to an embodiment.

Referring to FIG. 19, the display apparatus 1 may include a display module 20, a front cover 30 and a back cover 35 to surround the display module 20, a drive unit 55 provided at the back cover 35, and a drive unit cover 40 to encase the drive unit 55.

The front cover 30 may include a front panel (not shown) made of a transparent material to transmit light. The front panel serves to protect the display module 20 while being spaced apart from the display module 20 by a predetermined clearance, and transmits light emitted from the display module 20 so as to allow an image displayed on the display module 20 to be seen from the outside.

The back cover 35 may be coupled with the front cover 30 so as to protect the display module 20.

The drive unit 55 may be disposed on one surface of the back cover 35.

The drive unit 55 may include a drive controller 55a, a main board 55b, and a power supply 55c.

The drive controller 55a may be a timing controller. The drive controller 55a serves to adjust operation timing of each driver IC of the display module 20. The main board 55b serves to transmit V-sync, H-sync, and R, G and B resolution signals to the timing controller. The power supply 55c supplies power to the display module 20.

The drive unit 55 may be disposed on the back cover 35 and be encased by the drive unit cover 40.

The back cover 35 has a plurality of holes, through which the display module 20 may be connected to the drive unit 55. Also, a stand 60 to support the display apparatus 1 may be provided.

On the other hand, the drive controller 55a of the drive unit 55 may be provided at the cover 35, whereas the main board 55b and the power supply 55c may be provided in the stand 60, as shown in FIG. 20.

The drive unit cover 40 may be configured to encase only the drive unit 55 provided at the back cover 35.

Although the embodiment illustrates the main board 55b and the power supply 55c as being provided separately, they may be integrated, without being limited thereto.

In an alternative embodiment, the backlight unit of the above-mentioned embodiment may be applied to, for example, a display device including the first and second reflector, and the light source module, an indicating device, and a lighting system. For example, the lighting system may include a lamp, a streetlamp, and the like.

The lighting system may be utilized as lighting which obtains light by focusing a plurality of LEDs, particularly as a down light embedded in a ceiling or wall of a building so as to be mounted to expose an opening side of a shade.

As is apparent from the above description, a reflector for an air guide which is disposed with a reflective structure without using a light guide plate may be provided, thereby enabling provision of weight reduction, low cost, and uniform luminance.

Thus, a backlight unit can achieve improved economic efficiency and reliability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
    a first reflector;
    a second reflector partially having an inclined surface;
    at least one light source module disposed between the first and second reflectors, the at least one light source module comprising:
        a hoard; and
        a light source disposed on the board; and
    at least one reflective structure disposed on the second reflector, wherein the at least one reflective structure comprises:
        a reflective part to reflect light; and
        a support part to support the reflective part, and
    wherein the reflective part is disposed on the same line in a thickness direction of the board as the light source.

2. The lighting system according to claim 1, wherein the inclined surface of the second reflector comprises a surface inclined at a predetermined angle with respect to a surface of the first reflector.

3. The lighting system according to claim 1, wherein the inclined surface is at least one selected from the group consisting of a concave surface, convex surface, and flat surface.

4. The lighting system according to claim 1, wherein the second reflector further comprises at least one flat surface, the flat surface of the second reflector is a surface parallel to the first reflector, and the reflective structure is disposed on at least any one of the inclined and flat surfaces of the second reflector.

5. The lighting system according to claim 1, further comprising an optical member disposed to be spaced apart from the second reflector by a predetermined clearance so as to form a space therebetween,
wherein an air guide is defined in the space between the second reflector and the optical member.

6. The lighting system according to claim 5, wherein the reflective structure is disposed to be spaced apart from the optical member by a first distance.

7. The lighting system according to claim 6, wherein the first distance is greater than a thickness of the first reflector.

8. The lighting system according to claim 5, further comprising support frames to support the optical member.

9. The lighting system according to claim 1, wherein the reflective structure is placed between a horizontal extension line which horizontally extends from the first reflector and the second reflector.

10. The lighting system according to claim 1, wherein the reflective part has a stripe shape or a dot shape, a first direction in which the reflective part is arranged being the same as a second direction in which the light source module is arranged, wherein each of the first and second direction is different from the thickness direction of the board.

11. The lighting system according to claim 1, wherein the reflective part has a plurality of protrusions or grooves.

12. The lighting system according to claim 1, wherein the reflective part comprises:
a core; and
a reflective layer surrounding a whole or a portion of the core.

13. The lighting system according to claim 12, wherein the reflective layer is made of one reflective material having identical reflectivity or a plurality of reflective materials having different reflectivities.

14. The lighting system according to claim 12, wherein the reflective layer protrudes from or is inserted into a surface of the core.

15. The lighting system according to claim 1, wherein the support part has a lower portion thicker than an upper portion thereof.

16. The lighting system according to claim 1, wherein the support part has a maximum width equal to or greater than a maximum width of the reflective part.

17. The lighting system according to claim 1, wherein the support part has a maximum height equal to or greater than a maximum height of the reflective part.

18. The lighting system according to claim 1, wherein the reflective part and the support part are disposed in one-to-one correspondence proportion or in a one-to-many correspondence proportion.

19. The lighting system according to claim 1, wherein the reflective structure further comprises a coupling member coupling an upper surface of the support part with the reflective part.

20. A display apparatus comprising:
a display panel; and
a lighting system which irradiates light to the display panel,
wherein the lighting system comprises:
a first reflector;
a second reflector partially having an inclined surface;
at least one light source module disposed between the first and second reflectors, the at least one light source module comprising:
a board; and
a light source disposed on the board; and
at least one reflective structure disposed on the second reflector, wherein the at least one reflective structure comprises:
a reflective part to reflect light; and
a support part to support the reflective part, and
wherein the reflective part is disposed on the same line in a thickness direction of the board as the light source, and
wherein the display apparatus uses the lighting system.

* * * * *